United States Patent [19]

Endo et al.

[11] Patent Number: 5,476,544

[45] Date of Patent: Dec. 19, 1995

[54] WATER-BASED PIGMENT DISPERSION

[75] Inventors: Atsushi Endo; Akimitsu Mochizuki; Michichika Hikosaka; Tsutomu Fujigamori, all of Tokyo, Japan

[73] Assignee: Toyo Ink Manufacturing Co., Ltd., Tokyo, Japan

[21] Appl. No.: 369,515

[22] Filed: Jan. 6, 1995

Related U.S. Application Data

[63] Continuation-in-part of Ser. No. 201,027, Feb. 24, 1994, abandoned.

[30] Foreign Application Priority Data

Feb. 26, 1993 [JP] Japan ................................. 5-38445

[51] Int. Cl.$^6$ ........................................... C09D 4/02
[52] U.S. Cl. ........................ 106/499; 106/401; 106/411; 106/493; 106/494; 106/495; 106/496; 106/497; 106/498
[58] Field of Search ................................. 106/401, 411, 106/493, 494, 495, 496, 497, 498, 499

[56] References Cited

U.S. PATENT DOCUMENTS

| | | | |
|---|---|---|---|
| 3,891,455 | 6/1975 | Langley et al. | 106/411 |
| 4,317,682 | 3/1982 | Katsura et al. | 106/402 |
| 5,071,483 | 12/1991 | Dietz et al. | 106/411 |
| 5,207,829 | 5/1993 | Schwab et al. | 106/411 |
| 5,264,032 | 11/1993 | Dietz et al. | 106/411 |
| 5,318,627 | 7/1994 | Dietz et al. | 106/493 |

*Primary Examiner*—Mark L. Bell
*Assistant Examiner*—Scott L. Hertzog
*Attorney, Agent, or Firm*—Wenderoth, Lind & Ponack

[57] ABSTRACT

A water-based pigment dispersion excellent in gloss of a coating, tinting strength, fluidity and storage stability, comprising a pigment, a pigment dispersing agent of the formula (1) and a solid content, of a water-based resin which is obtained by copolymerizing an α, β-ethylenically unsaturated carboxylic acid (a), an α, β-ethylenically unsaturated, nitrogen-containing monomer (b) and other α, β-ethylenically unsaturated monomer (c), $$P-[X-Y-Z-N(R^1)R^2]_n \qquad (1)$$

wherein:

P is an organic dyestuff residue or a heterocyclic ring residue,

X is a divalent binding group consisting of 2 to 15 atoms selected from S, C, N, O and H atoms, Y is a direct bond, —N(R)— in which R is H, an alkyl group having 1 to 18 carbon atoms or Q—N(R$^3$)R$^4$ in which Q is an alkylene group having 1 to 6 carbon atoms and each of R$^3$ and R$^4$ is independently an optionally substituted alkyl group having 1 to 18 carbon atoms or R$^3$ and R$^4$ are together forming an optionally substituted heterocyclic ring which may contain N, O or S, or —O—, Z is an alkylene group having 1 to 6 carbon atoms, and each of R$^1$ and R$^2$ is independently an optionally substituted alkyl group having 1 to 18 carbon atoms or R$^1$ and R$^2$ are together forming an optionally substituted heterocyclic ring which may contain N, O or S, and n is an integer of 1 to 3.

9 Claims, No Drawings

WATER-BASED PIGMENT DISPERSION

This application is a continuation-in-part of now abandoned application Ser. No. 08/201,027 filed Feb. 24, 1994, abandoned.

FIELD OF THE INVENTION

The present invention relates to an organic solvent-free and water-based pigment dispersion which is excellent in the gloss of a coating and tinting strength and also excellent in fluidity and storage stability when used as a water-based coating composition or ink.

PRIOR ART OF THE INVENTION

In recent years, coating compositions and inks are being converted to organic solvent-free and water-based ones due to growing demands for the protection of resources, the protection of environments and improvement in working safety.

The properties which an organic solvent-free and water-based coating composition and ink are required to have are fluidity, storage stability, gloss of a coating, clearness and tinting strength, and this was also true of an organic solvent-containing coating composition and ink. Since, however, most of pigments have extremely poor suitability to water-based vehicles such as dispersibility, it is very difficult to obtain a coating composition or ink having satisfactory properties by a general dispersing method. The use of a variety of additives such as resins and surfactants for dispersing pigments in water-based vehicles has been hence studied. However, no organic solvent-free, water-based coating compositions and inks which have been obtained so far satisfy all of the above properties or exhibit no less adequate properties than existing organic solvent-containing coating compositions and inks. That is, some resins for dispersing pigments serve to give water-based pigment dispersions which are improved in gloss of a coating, clearness and tinting strength to some extent, while the following critical problems remain to solve; the fluidity is impaired, the dispersion shows an increase in viscosity, or undergoes gelation, with time, or there is an adverse effect on physical properties of a coating.

SUMMARY OF THE INVENTION

It is an object of the present invention to provide a water-based pigment dispersion excellent in gloss of a coating, tinting strength, fluidity and storage stability.

The above object and advantages of the present invention are achieved by a water-based pigment dispersion comprising 100 parts by weight of a pigment, 0.1 to 30 parts by weight of a pigment dispersing agent of the formula (1) and 5 to 500 parts by weight, as a solid content, of a water-based resin which is obtained by copolymerizing 5 to 20% by weight of an α, β-ethylenically unsaturated carboxylic acid (a), 5 to 50% by weight of an α, β-ethylenically unsaturated, nitrogen-containing monomer (b) and 30 to 90% by weight of an α, β-ethylenically unsaturated monomer (c) other than the α, β-ethylenically unsaturated carboxylic acid (a) and the α, β-ethylenically unsaturated, nitrogen-containing monomer (b), $$P-[X-Y-Z-N(R^1)R^2]_n \tag{1}$$

wherein:

P is an organic dyestuff residue or a heterocyclic ring residue,

X is a divalent binding group consisting of 2 to 15 atoms selected from S, C, N, O and H atoms, Y is a direct bond, —N(R)— in which R is H, an alkyl group having 1 to 18 carbon atoms or Q—N(R3)R$^4$ in which Q is an alkylene group having 1 to 6 carbon atoms and each of R$^3$ and R$^4$ is independently an optionally substituted alkyl group having 1 to 18 carbon atoms or R$^3$ and R$^4$ are together forming an optionally substituted heterocyclic ring which may contain N, O or S, or —O—, Z is an alkylene group having 1 to 6 carbon atoms, and each of R$^1$ and R$^2$ is independently an optionally substituted alkyl group having 1 to 18 carbon atoms or R$^1$ and R$^2$ are together forming an optionally substituted heterocyclic ring which may contain N, O or S, and n is an integer of 1 to 3.

DETAILED DESCRIPTION OF THE INVENTION

The present inventor has found that the above problems can be effectively overcome by incorporating 0.1 to 30% by weight, per 100 parts by weight of a pigment, of the pigment dispersing agent of the above formula (1).

The water-based pigment dispersion of the present invention comprises a pigment, a pigment dispersing agent of the formula (1) and a water-based resin.

The pigment used in the present invention includes a phthalocyanine pigment, an insoluble azo pigment, an azo lake pigment, an anthraquinone pigment, a quinacridone pigment, a dioxazine pigment, a diketopyrolopyrrole pigment, an anthrapyridine pigment, an anthanthrone pigment, an indanthrone pigment, a flavanthrone pigment, a perinone pigment, a perylene pigment, a thioindigo pigment, carbon black, iron oxide, white lead, red lead, ultramarine, oxide-coated mica, strontium chromate, titanium yellow, prussian blue, cobalt oxide, titanium dioxide, titanium titanium black, zinc chromate, black iron oxide, molybdenum red, molybdenum white, lithopone, emerald green, cadmium yellow, cadmium red and cobalt blue.

The pigment dispersing agent used in the present invention has the formula (1), $$P-[X-Y-Z-N(R^1)R^2]_n \tag{1}$$

wherein:

P is an organic dyestuff residue or a heterocyclic ring residue,

X is a divalent binding group consisting of 2 to 15 atoms selected from S, C, N, O and H atoms, Y is a direct bond, —N(R)— in which R is H, an alkyl group having 1 to 18 carbon atoms or Q—N(R3)R$^4$ in which Q is an alkylene group having 1 to 6 carbon atoms and each of R$^3$ and R$^4$ is independently an optionally substituted alkyl group having 1 to 18 carbon atoms or R$^3$ and R$^4$ are together forming an optionally substituted heterocyclic ring which may contain N, O or S, or —O—, Z is an alkylene group having 1 to 6 carbon atoms, and each of R$^1$ and R$^2$ is independently an optionally substituted alkyl group having 1 to 18 carbon atoms or R$^1$ and R$^2$ are together forming an optionally substituted heterocyclic ring which may contain N, O or S, and n is an integer of 1 to 3.

In the above formula (1), the organic dyestuff residue includes a phthalocyanine dyestuff residue, an insoluble azo dyestuff residue, an azo lake dyestuff residue, an anthraquinone dyestuff residue, a quinacridone dyestuff residue, a dioxazine dyestuff residue, a diketopyrolopyrrole dyestuff residue, an anthrapyridine dyestuff residue, an anthanthrone dyestuff residue, an indanthrone dyestuff residue, a flavanthrone dyestuff residue, a perinone dyestuff residue, a perylene dyestuff residue, a thioindigo dyestuff residue. Any one of the above dyestuff residues may be used, while it is industrially advantageous to use an organic dyestuff residue having a hue similar to that of the pigment used.

The heterocyclic ring includes thiophene, furan, xanthene, pyrrole, imidazole, isoindoline, isoindolinone, benzimidazolone, indole, quinoline, carbazole, acridine, acridone and anthraquinone.

When P is a heterocyclic ring residue, a colorless or almost colorless pigment dispersing agent can be obtained, which is preferred for use as a general pigment dispersing agent.

X is a binding group consisting of 2 to 15 atoms selected from S, C, N, O and H atoms, such as $-SO_2-$, $-CO-$, $-CH_2-$, $-CH_2-NHCOCH_2-$, $-O-$, $-COO-$, $-NH-$ or a combination thereof, preferably $-SO_2-$, $-CO-$, $-CH_2-$, $-CH_2-NHCOCH_2-$.

In the above formula (1), each of $R^1$ and $R^2$ is independently an optionally substituted alkyl group having 1 to 18 carbon atoms or $R^1$ and $R^2$ are together forming an optionally substituted heterocyclic ring which may contain N, O or S. The above alkyl group is preferably a lower alkyl group including methyl, ethyl, propyl and butyl. The alkyl group may be branched or substituted so long as the total of carbon atoms is 18 or less. Further, $R^1$ and $R^2$ may together form a 5- or 6-membered heterocyclic ring containing N, O or S.

In the above formula (1), Y is a direct bond, $-N(R)-$ in which R is H, an alkyl group having 1 to 18 carbon atoms or Q—$N(R3)R^4$ in which Q is an alkylene group having 1 to 6 carbon atoms and each of $R^3$ and $R^4$ is independently an optionally substituted alkyl group having 1 to 18 carbon atoms or $R^3$ and $R^4$ are together forming an optionally substituted heterocyclic ring which may contain N, O or S, or $-O-$. The above alkyl group for each of $R^3$ and $R^4$ is preferably a lower alkyl group including methyl, ethyl, propyl and butyl. The alkyl group may be branched or substituted so long as the total of carbon atoms is 18 or less. Further, $R^3$ and $R^4$ may together form a 5- or 6membered heterocyclic ring containing N, O or S.

The pigment dispersing agent used in the present invention can be produced by a method in which a substituent such as $-SO_2Cl$, $-COCl$, $-CH_2Cl$ or $-CH_2NHCOCH_2Cl$ is first introduced into the organic dyestuff or heterocyclic ring by a known method, and then allowed to react with a compound having the structure of Y—Z—$N(R^1)R^2$ described in the formula (1). The compound corresponding to Y and Z—$N(R^1)R^2$ N,N-dimethylaminomethyl, N,N-dimethylaminoethyl, N,N-dimethylaminopropyl, N,N-dimethylaminoamyl, N,N-dimethylaminobutyl, N,N-diethylaminoethyl, N,N-diethylaminoethoxypropyl, N,N-diethylaminobutyl, N,N-diethylaminopentyl, N,N-dipropylaminobutyl, N,N-dibutylaminopropyl, N,N-dibutylaminoethyl, N,N-dibutylaminobutyl, N,N-diisobutylaminopentyl, N,N-methyllaurylaminopropyl, N,N-ethyl-hexylaminoethyl, N,N-distearylaminoethyl, N,N-dioleylaminoethyl, N,N-distearylaminobutyl, N-aminoethylpiperidine, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-aminomethylpiperldine, N-hydroxymethylpiperidine, N-hydroxymethylpiperidine, N-hydroxypropylpiperidine, N-hydroxyethylpipecoline, N-hydroxypropylpipecoline, N-hydroxymethylpyrrolidine, N-hydroxyethylmorpholine, N-hydroxybutylmorpholine, N-aminopropylmorpholine and N-aminopropylthiazolidine.

The above pigment dispersing agent may be used in a dry powder state when the pigment is dispersed, or it may be mixed with the pigment before use. Further, the above pigment dispersing agent may be used as a solution or dispersion thereof in a solvent or a mineral acid. In this case, the pigment dispersing agent is added to a slurry of the pigment in water or a solvent to be adsorbed on the pigment surface. When the pigment is an azo pigment, the pigment dispersing agent in a powder, solution or dispersion state may be added during the coupling reaction whereby the pigment dispersing agent is adsorbed on the pigment surface. Then, the mixture is filtered and then dried as required. When the pigment is a phthalocyanine pigment, a quinacridone pigment or a dioxazine pigment, the pigment dispersing agent in a powder, solution or dispersion state may be added during the pigment forming step such in a salt milling method or sulfuric acid dissolving method, whereby the pigment dispersing agent is adsorbed on the pigment. Then the mixture is filtered and then dried as required.

The amount of the pigment dispersing agent per 100 parts by weight of the pigment is 0.1 to 30 parts by weight. When this amount is less than 0.1 part by weight, the object of the present invention is hardly accomplished. When it exceeds 30 parts by weight, no further effect is obtained.

The water-based resin used in the present invention is preferably a water-dispersible resin or water-soluble resin of an acrylic copolymer resin.

The acrylic copolymer resin is obtained by copolymerizing 5 to 20% by weight of an α, β-ethylenically unsaturated carboxylic acid (a), 5 to 50% by weight of an α, β-ethylenically unsaturated, nitrogen-containing monomer (b) and 30 to 90% by weight of an α, β-ethylenically unsaturated monomer (c) other than the above monomers.

The α, β-ethylenically unsaturated carboxylic acid (a) includes acrylic acid, methacrylic acid, crotonic acid, maleic acid, fumaric acid, citraconic acid and iraconic acid.

The α, β-ethylenically unsaturated, nitrogen-containing monomer (b) includes aminoalkyl (meth)acrylates and monoalkyl- or dialkyl-substituted compounds thereof such as aminoethyl (meth)acrylate, aminopropyl (meth)acrylate, aminobutyl (meth)acrylate, N-ethylaminoethyl (meth)acrylate, N-propylaminoethyl (meth)acrylate, N-butylaminoethyl (meth)acrylate, N,N-dimethylaminoethyl (meth)acrylate, N,N-dimethylaminopropyl (meth)acrylate, N,N-dimethylaminoethyl (meth)acrylate, N,N-dtethylaminopropyl (meth)acrylate and-diethylaminobutyl (meth)acrylate; and aminoalkyl(meth)acrylamides and monoalkyl- or dialkyl-substituted compounds thereof such as aminiethyl(meth)acrylamide, aminopropyl(meth)acrylamide, aminobutyl(meth)acrylamide, N-ethylaminoethyl(meth)acrylamide, N-propylaminoethyl(meth)acrylamide, N-butylaminoethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide and N,N- diethylaminobutyl(meth)acrylamide. Further, the α, β-ethylenically unsaturated, nitrogen-containing monomer (b) also includes vinylpyrrolidone, vinylpyridine, vinylimidazole, vinylcarbazole, vinylquinoline and vinylpiperidine.

The α, β-ethylenically unsaturated monomer (c) includes alkyl (meth)acrylates such as methyl (meth)acrylate, ethyl (meth)acrylate, propyl (meth)acrylate, butyl (meth)acrylate and hexyl (meth)acrylate; hydroxyalkyl (meth)acrylates such as 2-hydroxyethyl (meth)acrylate and hydroxypropyl (meth)acrylate; vinyl aromatic compounds such as styrerie, α-methylstyrene, vinyltoluene and p-chlorostyrene; (meth)acrylonitrile; and vinyl acetate.

The content of a component from the α, β-ethylenically unsaturated carboxylic acid (a) in the waterbased resin is 5 to 20% by weight, preferably 8 to 15% by weight. When the above amount is less than the above lower limit, the mutual action between the water-based resin and basic group of the pigment dispersing agent of the formula (1) becomes insufficient so that the dispersibility of the pigment decreases.

The content of a component from the α, β-ethylenically unsaturated, nitrogen-containing monomer (b) in the water-based resin is 5 to 50% by weight, preferably 10 to 30% by weight. When the above amount is less than the above lower limit, the water-based resin insufficiently secures the hydrophilic nature of the pigment even after the water-based resin is adsorbed on the pigment dispersion, so that the dispersibility of the pigment dispersion decreases.

The acrylic copolymer as the water-based resin used in the present invention is obtained by solution-polymerization or emulsion-polymerization of the above monomers, and it has an acid value of 1 to 200 and a weight average molecular weight of 5,000 to 300,000.

The above water-dispersible resin can be produced by dropwise adding a mixture of the above monomers to an aqueous medium containing an emulsifier and emulsion-polymerizing these. The aqueous medium may contain a dispersing agent having a high molecular weight in place of, or together with, the emulsifier. In the above water-dispersible resin, the carboxylic acid integrated with a resin may be neutralized by adding an amine or ammonia for dispersing the water-dispersible resin in an aqueous dispersion. For example, the water-dispersible resins can be obtained by neutralizing an acrylic copolymer resin having a free carboxylic acid, obtained by the polymerization in a hydrophilic organic solvent, with an organic amine and then adding water.

The above water-soluble resin can be produced by neutralizing an acrylic copolymer resin having a free carboxylic acid, obtained by the polymerization of the above monomers, with an organic amine and then adding water.

The aqueous medium used for the production of the water-based resin used in the present invention may be water alone or a mixture of water with up to 50% by weight of an alcohol such as ethyl alcohol, isopropyl alcohol, n-propyl alcohol or n-butanol or a water-miscible organic solvent such as mono- or dialkyl ether of ethylene glycol or diethylene glycol.

The amount of the water-based resin per 100 parts by weight of the pigment is 5 to 500 parts by weight, preferably 5 to 200 parts by weight. When this amount is less than 5 parts by weight, it is difficult to disperse the pigment completely. When it is more than 500 parts by weight, the coloring strength is low, and the pigment dispersion is not suitable for use as a coating composition or a printing ink.

The water-based pigment dispersion of the present invention can be produced by a method in which the pigment and the pigment dispersing agent are incorporated into a dispersion or solution of the water-based resin. Further, it can be also produced by a method in which a pigment composition containing the pigment and the pigment dispersing agent is incorporated into a dispersion or solution of the water-based resin. The pigment and the pigment dispersing agent, or the pigment composition, can be dispersed in a solution or dispersion of the water-based resin with a dispersing apparatus such as a dissolver, a high-speed mixer, a homomixer, a sand mill or an attriter.

The water-based pigment dispersion of the present invention can be used as a water-based coating composition, a water-based ink or a concentrate of each of these.

EXAMPLES

The present invention will be detailed hereinafter with reference to Examples, in which "part" stands for "part by weight".

PREPARATION EXAMPLE 1

306 Parts dimethylaminopropylamine was added to 1,000 parts of water, and a water-based wet cake containing 145 parts of copper phthalocyanine sulfonyl chloride (containing 1.5 chlorosulfonyl groups per mole on average) was added. The mixture was stirred at 65° C. for 2 hours. The reaction mixture was filtered and the remaining solid was washed with water and dried at 80° C. to give 230 parts of a blue powder (Pigment dispersing agent A).

PREPARATION EXAMPLE 2

474 Parts of dibutylaminomethylamine was added to 2,000 parts of dimethylformamide, and 135 parts of chloromethyl copper phthalocyanine (containing 2 chloromethyl groups per mole on average) was added. The mixture was stirred at 100° C. for 3 hours. The reaction mixture was filtered and the remaining solid was washed with water and dried at 80° C. to give 250 parts of a blue powder (Pigment dispersing agent B).

PREPARATION EXAMPLE 3

260 Parts diethylaminopropylamine was added to 1,000 parts of water, and a water-based wet cake containing parts of chloroacetoaminomethyl copper phthalocyanine (containing one chloroacetoaminomethyl group per mole on average) was added. The mixture was stirred at 60° C. for 1 hour. The reaction mixture was filtered and the remaining solid was washed with water and dried at 80° C. to give 230 parts of a blue powder (Pigment dispersing agent C).

PREPARATION EXAMPLES 4–19

Pigment dispersing agents D to S shown in Table 1 were prepared according to Preparation Examples 1 to 3.

TABLE 1

| P Ex. | Pigment dispersing agent | Organic dyestuff or heterocyclic ring | Substituent | Number of substituent |
|---|---|---|---|---|
| 1 | A | C.I. Pigment Blue 15 | $-SO_2NH(CH_2)_2N(CH_3)_2$ | 1.5 |
| 2 | B | C.I. Pigment Blue 15 | $-CH_2NHCH_2N(C_4H_9)_2$ | 2 |
| 3 | C | C.I. Pigment Blue 15 | $-CH_2NHCOCH_2-NH(CH_2)_3N(C_4H_9)_2$ | 1 |
| 4 | D | C.I. Pigment Violet 19 | $-SO_2NH(CH_2)_3N(CH_3)_2$ | 2 |
| 5 | E | C.I. Pigment Violet 19 | $-CH_2NHCOCH_2-NH(CH_2)_3N(C_2H_5)_2$ | 1 |
| 6 | F | C.I. Pigment Violet 23 | $-SO_2NH(CH_2)_3(C_3H_7)_2$ | 1 |
| 7 | G | C.I. Pigmemt Orange 43 | $-CH_2N(CH_3)(CH_2)_3NHC_{18}H_{37}$ | 1 |
| 8 | H | C.I. Pigment Yellow 24 | 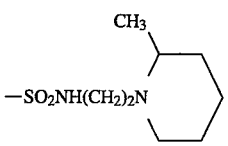 | 1 |
| 9 | I | C.I. Pigment Red 178 | 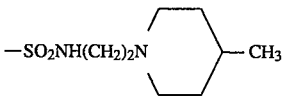 | 1 |
| 10 | J | C.I. Pigment Yellow 108 | 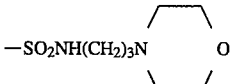 | 1 |
| 11 | K | C.I. Pigment Red 168 | $-SO_2NH(CH_2)_3N(C_3H_7)_2$ | 1 |
| 12 | L | C.I. Pigment Blue 60 | $-SO_2NH(CH_2)_3N(CH_3)_2$ | 2 |
| 13 | M | C.I. Pigment Red 88 | $-SO_2NH(CH_2)_3N(CH_3)_2$ | 1 |
| 14 | N | C.I. Pigment Yellow 83 | $-SO_2NH(CH_2)_3N(C_2H_5)_2$ | 1 |
| 15 | O | C.I. Pigment Red 2 | $-CONH(CH_2)_3N(C_4H_9)_2$ | 1 |
| 16 | P | C.I. Pigment Red 254 | $-SO_2NH(CH_2)_3N(CH_3)_2$ | 1 |
| 17 | Q | Anthraquinone | $-CONH(CH_2)_3N(C_3H_7)_2$ | 1 |
| 18 | R | Acridone | $-SO_2NH(CH_2)_2N(C_4H_9)_2$ | 1 |
| 19 | S | Carbazole | $-SO_2NH(CH_2)_2N(CH_3)_2$ | 1 |

EXAMPLE 1

9.9 Parts of C.I. Pigment Blue 15:1, 0.1 part of Pigment dispersing agent A, 12.5 parts of a solution (solid content 20%) of an acryl copolymer having a weight average molecular weight of 25,000, an acid value of 60 and an acrylic acid/dimethylaminoethyl methacrylate/ethyl acrylate/methyl acrylate/vinyl acetate weight ratio (as monomers) of 7.7/15/37.3/30/10, 20 parts of ion-exchanged water and 150 parts of alumina beads having a diameter of 3 mm were placed in a 225 ml glass container, and dispersed with a paint conditioner for 3 hours. Then, 37.5 parts of the same acrylic resin solution as that described above and 4.3 parts of a methylated melamine resin (trade name: Cymel 303, supplied by Mitsui-Cyanamid) were added to and mixed with the above mixture to give a water-based coating composition. The so-obtained coating composition was coated on a PET film with a 4-mill film applicator and baked at 140° C. for 30 minutes to give a coating having excellent gloss. The coating was measured for a 20° gloss with a digital angle-variable gloss meter to show 62°.

COMPARATIVE EXAMPLE

A water-based coating composition was obtained in the same manner as in Example 1 except that the solution of an acryl copolymer was replaced with a solution (solid content 20%) of an acrylate copolymer having a weight average molecular weight of 25,000, an acid value of 60 and an acrylic acid/ethyl acrylate/methyl acrylate/vinyl acetate weight ratio (as monomers) of 7.7/37.3/45/10. The so-obtained coating composition was coated on a PET film in the same manner as in Example 1. The resultant coating was measured for a 20° gloss in the same manner as in Example 1 to show 53%, which was poor as compared with the result obtained in Example 1.

EXAMPLES 2–23

Coating compositions were prepared from a variety of pigments and the pigment dispersing agents B to S, and the so-obtained coating compositions were coated on PET films, in the same manner as in Example 1, whereby coatings having excellent gloss were obtained. The coatings were measured for a 20° gloss with a digital angle-variable gloss meter. Table 2 shows the results.

COMPARATIVE EXAMPLES

Coating compositions were prepared from the same pigments as those used in Examples 1 to 23 without using the pigment dispersing agents. And, the so-obtained coating compositions were coated on PET films in the same manner as in Example 1. The resultant coatings were poor in gloss as compared with those obtained from coating compositions containing the pigment dispersing agents. Table 2 shows the results.

TABLE 2

|  | Pigment | Pigment dispersing agent | Amount ratio* | 20° gloss |
|---|---|---|---|---|
| CEx | C.I. Pigment Blue 15:1 | — | 10/0 | 48 |
| Ex. 1 | C.I. Pigment Blue 15:1 | A | 9.9/0.1 | 62 |
| CEx | C.I. Pigment Blue 15:1 | A | 9.9/0.1 | 53 |
| Ex. 2 | C.I. Pigment Blue 15:1 | A | 9.5/0.5 | 66 |
| Ex. 3 | C.I. Pigment Blue 15:1 | A | 9/1 | 69 |
| Ex. 4 | C.I. Pigment Blue 15:1 | B | 9/1 | 69 |
| Ex. 5 | C.I. Pigment Blue 15:1 | C | 9/1 | 68 |
| CEx | C.I. Pigment Violet 19 | — | 10/0 | 56 |
| Ex. 6 | C.I. Pigment Violet 19 | D | 9/1 | 78 |
| Ex. 7 | C.I. Pigment Violet 19 | E | 9/1 | 75 |
| Ex. 8 | C.I. Pigment Violet 19 | R | 9/1 | 70 |
| CEx. | C.I. Pigment Violet 23 | — | 10/0 | 45 |
| Ex. 9 | C.I. Pigment Violet 23 | F | 9.5/0.5 | 62 |
| Ex. 10 | C.I. Pigment Violet 23 | S | 9.5/0.5 | 59 |
| CEx. | C.I. Pigmemt Orange 43 | — | 10/0 | 51 |
| Ex. 11 | C.I. Pigment Orange 43 | G | 9/1 | 65 |
| CEx. | C.I. Pigment Yellow 24 | — | 10/0 | 35 |
| Ex. 12 | C.I. Pigment Yellow 24 | H | 9/1 | 68 |
| CEx. | C.I. Pigment Red 178 | — | 10/0 | 52 |
| Ex. 13 | C.I. Pigment Red 178 | I | 9/1 | 66 |
| CEx. | C.I. Pigment Yellow 108 | — | 10/0 | 45 |
| Ex. 14 | C.I. Pigment Yellow 108 | J | 8/2 | 59 |
| CEx. | C.I. Pigment Red 168 | — | 10/0 | 51 |
| Ex. 15 | C.I. Pigment Red 168 | K | 9/1 | 79 |
| CEx. | C.I. Pigment Blue 60 | — | 10/0 | 33 |
| Ex. 16 | C.I. Pigment Blue 60 | L | 9/1 | 68 |
| CEx. | C.I. Pigment Red 88 | — | 10/0 | 34 |
| Ex. 17 | C.I. Pigment Red 88 | M | 9/1 | 58 |
| CEx. | C.I. Pigment Red 23 | — | 10/0 | 57 |
| Ex. 18 | C.I. Pigment Red 23 | N | 9/1 | 77 |
| CEx. | C.I. Pigment Red 48:4 | — | 10/0 | 45 |
| Ex. 19 | C.I. Pigment Red 48:4 | N | 9.5/0.5 | 76 |
| CEx. | C.I. Pigment Yellow 83 | — | 10/0 | 61 |
| Ex. 20 | C.I. Pigment Yellow 83 | P | 9.5/0.5 | 84 |
| CEx. | C.I. Pigment Red 177 | — | 10/0 | 32 |
| Ex. 21 | C.I. Pigment Red 177 | Q | 9/1 | 79 |
| CEx. | C.I. Pigment Black 11 | — | 10/0 | 68 |
| Ex. 22 | C.I. Pigment Black 11 | A | 9/1 | 81 |
| CEx. | C.I. Pigment Red 101 | — | 10/0 | 78 |
| Ex. 23 | C.I. Pigment Red 101 | C | 9/1 | 91 |

Ex. = Example, CEx. = Comparative Example
*Amount ratio = Pigment/Pigment dispersing agent

What is claimed is:

1. A water-based pigment dispersion comprising 100 parts by weight of a pigment, 0.1 to 30 parts by weight of a pigment dispersing agent of the formula (1) and 5 to 500 parts by weight, as a solid content, of a water-based resin which is obtained by copolymerizing 5 to 20% by weight of an α, β-ethylenically unsaturated carboxylic acid (a), 5 to 50% by weight of an α, β-ethylenically unsaturated, nitrogen-containing monomer (b) and 30 to 90% by weight of an α, β-ethylenically unsaturated monomer (c) other than the α, β-ethylenically unsaturated carboxylic acid (a) and the α, β-ethylenically unsaturated, nitrogen-containing monomer (b), $$P-[X-Y-Z-N(R^1)R^2]_n \quad (1)$$

wherein:

P is an organic dyestuff residue or a heterocyclic ring residue,

X is a divalent binding group consisting of 2 to 15 atoms selected from S, C, N, O and H atoms, Y is a direct bond, —N(R)— in which R is H, an alkyl group having 1 to 18 carbon atoms or Q—N(R3)R$^4$ in which Q is an alkylene group having 1 to 6 carbon atoms and each of R$^3$ and R$^4$ is independently an optionally substituted alkyl group having 1 to 18 carbon atoms or R$^3$ and R$^4$ are together forming an optionally substituted heterocyclic ring which may contain N, O or S, or —O—, Z is an alkylene group having 1 to 6 carbon atoms, and each of R$^1$ and R$^2$ is independently an optionally substituted alkyl group having 1 to 18 carbon atoms or R$^1$ and R$^2$ are together forming an optionally substituted heterocyclic ring which may contain N, O or S, and n is an integer of 1 to 3.

2. A water-based pigment dispersion according to claim 1, wherein the α, β-ethylenically unsaturated, nitrogen-containing monomer (b) is at least one member selected from the group consisting of aminoalkyl (meth)acrylates and monoalkyl- or dialkyl-substituted compounds thereof, aminoalkyl(meth)acrylamides and monoalkyl- or dialkyl-substituted compounds thereof, and (meth)acrylamides.

3. A water-based pigment dispersion according to claim 1, wherein the α, β-ethylenically unsaturated monomer (c) is at least one member selected from the group consisting of alkyl (meth)acrylates, hydroxyalkyl (meth)acrylates and vinyl aromatic compounds.

4. A water-based pigment dispersion according to claim 1, wherein the water-based resin is an acrylic copolymer resin which is soluble in an aqueous medium containing 50% by weight or less of a water-miscible organic solvent.

5. A water-based pigment dispersion according to claim 4, wherein the acrylic copolymer resin has an acid value of 1 to 200 and a weight average molecular weight of 5,000 to 300,000.

6. A water-based pigment dispersion according to claim 1, wherein the pigment is a phthalocyanine pigment and P in the formula (1) for the pigment dispersing agent is a phthalocyanine residue.

7. A water-based pigment dispersion according to claim 1, wherein the pigment is a quinacridone pigment and P in the formula (1) for the pigment dispersing agent is a quinacridone residue.

8. A water-based pigment dispersion according to claim 1, wherein X is a divalent binding group selected from the class consisting of —SO$_2$—, —CO—, —CH$_2$— and —CH$_2$NHCOCH$_2$—.

9. A water-based pigment dispersion according to claim 1, wherein the water-based resin is contained in an amount of 5 to 200 parts by weight as a solid content.

* * * * *

UNITED STATES PATENT AND TRADEMARK OFFICE
CERTIFICATE OF CORRECTION

PATENT NO. : 5,476,544
DATED : December 19, 1995
INVENTOR(S) : Atsushi ENDO, Akimitsu MOCHIZUKI, Michichika HIKOSAKA and Tsutomu FUJIGAMORI It is certified that error appears in the above-indentified patent and that said Letters Patent is hereby corrected as shown below:

In claim 1, at column 10, line 6, change "$Q-N(R3)R^4$" to --$Q-N(R^3)R^4$--.

Signed and Sealed this

Sixth Day of August, 1996

*Attest:*

BRUCE LEHMAN

*Attesting Officer*     Commissioner of Patents and Trademarks